A. C. BRITTAN.
Rocking Chair.

No. 9,647. Reissued April 12, 1881.

WITNESSES:
William L. Raymond.
E. Laass

INVENTOR:
Atwell C. Brittan
per Dull, Laass & Hey
Attorneys

N. PETERS, PHOTO-LITHOGRAPHER, WASHINGTON, D. C.

UNITED STATES PATENT OFFICE.

ATWELL C. BRITTAN, OF THERESA, NEW YORK.

ROCKING-CHAIR.

SPECIFICATION forming part of Reissued Letters Patent No. 9,647, dated April 12, 1881.

Original No. 222,862, dated December 23, 1879. Application for reissue filed March 13, 1880.

*To all whom it may concern:*

Be it known that I, ATWELL C. BRITTAN, of Theresa, in the county of Jefferson, in the State of New York, have invented new and useful Improvements in Rocking-Chairs, (not patented to me nor with my knowledge or consent in any foreign country,) of which the following, taken in connection with the accompanying drawings, is a full, clear, and exact description.

The nature of this invention consists, essentially, in the combination of a back-frame having its main supports or standards extended to and connected directly with the rockers, two side rails extended from the upper part of the aforesaid standards to the front end of the rockers and arched to form the arms, seat-support, and front legs combined, and the seat having its front cross-bar extended over and supported above the arched portion of the aforesaid side rails by rods or pins projecting from the latter, by which improvements the seat is invariably supported at its extreme front, and a very simple and comparatively inexpensive yet very substantial rocker is obtained.

Figure 1:
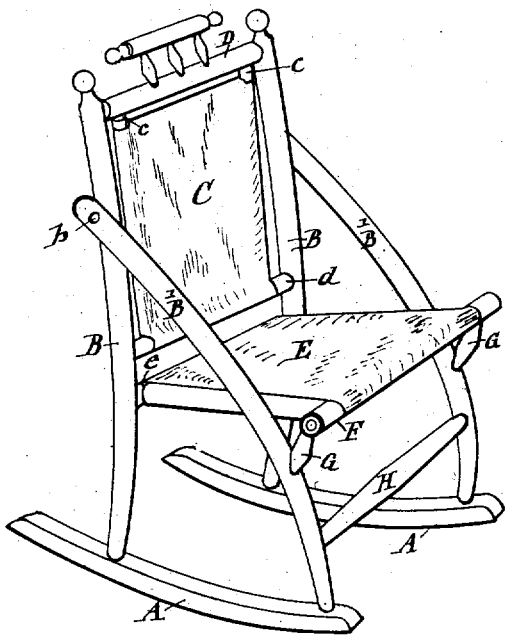
Figure 2:
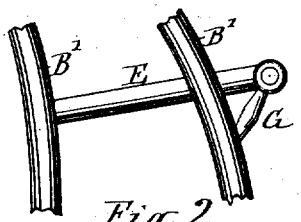

The invention is clearly illustrated in the accompanying drawings, wherein Figure 1 is a perspective view of my improved chair, and Fig. 2 is a detail view of a portion thereof.

Similar letters of reference indicate corresponding parts.

A A represent the two rockers, of the usual form. B B are the rear standards, forming the hind legs and back supports in one piece, and connected together above the seat by cross-bars *d* and D, which, in conjunction with vertical rods *c c*, connected thereto, form the frame for the back C.

From the upper part of the hind standards, B B, to the front end of the rockers are extended side rails, B′ B′, arched or curved upward in such a manner as to form, by the upper portions thereof, the arms of the chair, and at the same time bring the lower end nearer to a vertical and more appropriate position to serve as front legs of the chair. By means of a spindle or so-called "round," H, connected to the lower portions of the rails B′ B′, the same are properly braced.

E denotes the seat, composed of any suitable material, secured to a seat-frame constructed of a cross-bar, *e*, attached to the rear standards, B, and of a cross-bar, F, which is connected with the rear cross-bar, *e*, by two side rails of sufficient length to bring the cross-bar F in front of the combined arm and front leg, B′. The said cross-bar F is extended across the front of the members B′, and supported above the same by rods or pins G G. By extending the two side rails of the seat and supporting the front cross-bar, F, by oblique pins or braces G G, in the manner shown, the seat is enlarged and rendered more commodious.

Having thus described my invention, what I claim as new, and desire to secure by Letters Patent, is—

1. The combination of the rockers, standards B, combined arms and front legs, B′, the seat-frame having the front cross-rail, F, extended across the members B′, and the rods or pins connecting said cross-rail and members B′, as and for the purpose set forth.

2. The herein-described rocking-chair, consisting of the rockers A A, curved back standards, B B, forward standards, B′ B′, secured to back standards and curving forwardly and downwardly, and forming the front legs and arms of the chair, seat-frame E, secured to the back standards, with its front bar, F, projecting a short distance forward of and in line with the front standards, and the oblique braces G G, connecting said cross-bar F and the standards B′ B′, substantially as and for the purposes specified.

In testimony whereof I have hereunto signed my name this 28th day of February, 1880.

ATWELL C. BRITTAN.

Witnesses:
E. LAASS,
WM. C. RAYMOND.